United States Patent
Wu

(10) Patent No.: US 9,528,580 B2
(45) Date of Patent: Dec. 27, 2016

(54) LINEAR ACTUATOR

(71) Applicant: TIMOTION TECHNOLOGY CO., LTD., New Taipei (TW)

(72) Inventor: Chou-Hsin Wu, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 271 days.

(21) Appl. No.: 14/141,248

(22) Filed: Dec. 26, 2013

(65) Prior Publication Data

US 2015/0143934 A1 May 28, 2015

(30) Foreign Application Priority Data

Nov. 28, 2013 (TW) .............................. 102222275 U

(51) Int. Cl.
*F16H 25/20* (2006.01)
*A61G 7/018* (2006.01)
*A47C 20/04* (2006.01)

(52) U.S. Cl.
CPC ............ *F16H 25/20* (2013.01); *A47C 20/041* (2013.01); *A61G 7/018* (2013.01); *F16H 2025/209* (2013.01); *F16H 2025/2059* (2013.01); *F16H 2025/2084* (2013.01); *Y10T 74/18624* (2015.01)

(58) Field of Classification Search
CPC .. F16H 25/20; F16H 25/205; F16H 2025/209; F16H 2025/2084
USPC ............................................... 74/89.23, 89.29
See application file for complete search history.

(56) References Cited

U.S. PATENT DOCUMENTS

| | | | | |
|---|---|---|---|---|
| 4,871,246 A | * | 10/1989 | Manzoni | B60R 1/072 310/83 |
| 5,063,623 A | * | 11/1991 | Bathrick | A61G 7/015 5/616 |
| 5,075,911 A | * | 12/1991 | Dewert | A47C 31/008 5/616 |
| 6,517,157 B1 | * | 2/2003 | Vorac | B60N 2/0232 297/344.13 |
| 6,679,555 B2 | * | 1/2004 | Bangert | A47C 20/08 297/316 |
| 6,879,073 B2 | * | 4/2005 | Roither | A47C 20/041 310/80 |
| 7,484,254 B2 | * | 2/2009 | Eriksson | A47C 20/041 5/616 |
| 7,596,820 B2 | * | 10/2009 | Nielsen | A47C 20/08 297/362.14 |

(Continued)

*Primary Examiner* — Victor MacArthur
(74) *Attorney, Agent, or Firm* — Chun-Ming Shih; HDLS IPR Services

(57) ABSTRACT

A linear actuator includes a housing (100), a base plate (200) disposed in the housing (100), and two actuating mechanisms (310, 320) disposed on the base plate (200) and received in the housing (100). Each actuating mechanism (310/320) comprises a motor (311/321), a transmission assembly (312/322), a screw rod (313/323), and a supporting block (314/324). Two motors (311, 321) and two transmission assemblies (312, 322) are disposed on the base plate (200). Two motors (311, 321) are kinetically connected to two assemblies (312, 322), respectively. One end of the screw rod (313/323) is connected to and rotated by the transmission assemblies (312/322). The other end of the screw rod (313/323) is screwed to the supporting block (314/324). Thus, two supporting blocks (314, 324) are driven to move in the housing (100).

10 Claims, 9 Drawing Sheets

(56) References Cited

U.S. PATENT DOCUMENTS

| | | | | |
|---|---|---|---|---|
| 7,611,128 B2* | 11/2009 | Wu | ................. | A47C 19/045 |
| | | | | 254/233 |
| 8,763,483 B2* | 7/2014 | Heinrichs | ............ | A47C 20/041 |
| | | | | 318/7 |
| 8,875,592 B2* | 11/2014 | Bastholm | ............. | A47C 20/041 |
| | | | | 74/89.38 |
| 2009/0151490 A1* | 6/2009 | Kristensen | .......... | F16H 25/2015 |
| | | | | 74/89.37 |
| 2014/0311265 A1* | 10/2014 | Duck | ................. | F16H 25/20 |
| | | | | 74/89.23 |

* cited by examiner

LINEAR ACTUATOR

BACKGROUND OF THE INVENTION

Field of the Invention

The present invention relates to a linear actuator and in particular to a linear actuator with both-end actuation.

Description of Related Art

The dual-motor electrical actuator uses tow motors disposed inside to actuate a mechanical structure through both ends of the electrical actuator, which is usually applied to move a piece of furniture such as a bed.

Each motor of the traditional dual-motor electrical actuator is connected to a screw rod disposed in a housing and is positioned firmly by the housing. One end of the screw rod is screwed to a supporting block which is confined in the housing and cannot rotate. Thus, when the motor drives the screw rod to rotate, the screw rod can move the supporting block and then move a mechanical structure. A disadvantage of the traditional dual-motor electrical actuator is that because the motors are fixed to the housing, when the traditional dual-motor electrical actuator operates, the housing has to withstand all the reaction forces and torques generated during the actuation movement. Also, the housing of a typical electrical actuator is made of plastic; thus, it needs the design of structural reinforcement, causing a higher cost and a possibility of inadequate structural strength.

In view of this, the inventor pays special attention to research with the application of related theory and tries to overcome the above disadvantages regarding the above related art, which becomes the goal of the inventor's improvement.

SUMMARY OF THE INVENTION

The present invention is to provide a linear actuator with both-end actuation, in which two motors are connected and fixed to a base plate. In this way, the structural strength requirement for the housing of the linear actuator can be reduced to extend the lifetime of the actuator and to lower the manufacturing cost.

Accordingly, the present invention provides a linear actuator comprising a housing, a base plate, and two actuating mechanisms. The base plate is disposed in the housing. The two actuating mechanisms are disposed on the base plate and received in the housing. Each of the two actuating mechanisms comprises a motor, a transmission assembly, a screw rod, and a supporting block. Two motors and two transmission assemblies are disposed on the base plate and the motors are kinetically connected to the two transmission assemblies, respectively. One end of the screw rod is connected to and rotated by the transmission assembly; the other end of the screw rod is screwed to the supporting block. Thus, two supporting blocks are driven to move in the housing.

Preferably, in the above-mentioned linear actuator, two tracks are formed in the housing. The transmission assemblies are configured to the two tracks and the supporting blocks are received in the two tracks, respectively.

Preferably, in the above-mentioned linear actuator, two screw rods are coaxially disposed with the two tracks, respectively.

Preferably, in the above-mentioned linear actuator, the two tracks are disposed coaxially with each other.

Preferably, in the above-mentioned linear actuator, the motor of each actuating mechanism and the corresponding transmission assembly are disposed on one of the opposite sides of the base plate.

Preferably, in the above-mentioned linear actuator, each motor comprises a driving shaft penetrating the base plate to be connected to the corresponding transmission assembly.

Preferably, the above-mentioned linear actuator further comprises two linkage assemblies, each of which is pivoted to the housing. One end of each linkage assembly is located outside the housing; the other end of the each linkage assembly is located inside the housing and pressed against the corresponding supporting block.

Preferably, the above-mentioned linear actuator further comprises two linkage assemblies, each of which is corresponding to the respective track and pivoted to the housing. One end of each linkage assembly is located outside the housing; the other end of the each linkage assembly is located inside the housing and configured at one end of the corresponding track.

Preferably, in the above-mentioned linear actuator, each linkage assembly comprises a pivot penetrated through and pivoted to the housing. The pivot extends radially to form an outer linkage located outside the housing and an inner linkage located inside the housing and configured at one end of the corresponding track to be pressed against by the respective supporting block in the respective track.

Preferably, in the above-mentioned linear actuator, the outer linkage is connected to a supporting plate.

Preferably, in the above-mentioned linear actuator, the base plate is connected to the housing by screws.

The linear actuator of the present invention uses the base plate connected to two actuating mechanisms to withstand all the forces and torques generated during the operation of the two actuating mechanisms. Thus, the forces and torques exerted on the housing can be decreased and further the structural strength requirement of the housing can be reduced.

DETAILED DESCRIPTION OF THE INVENTION

Figure 1:
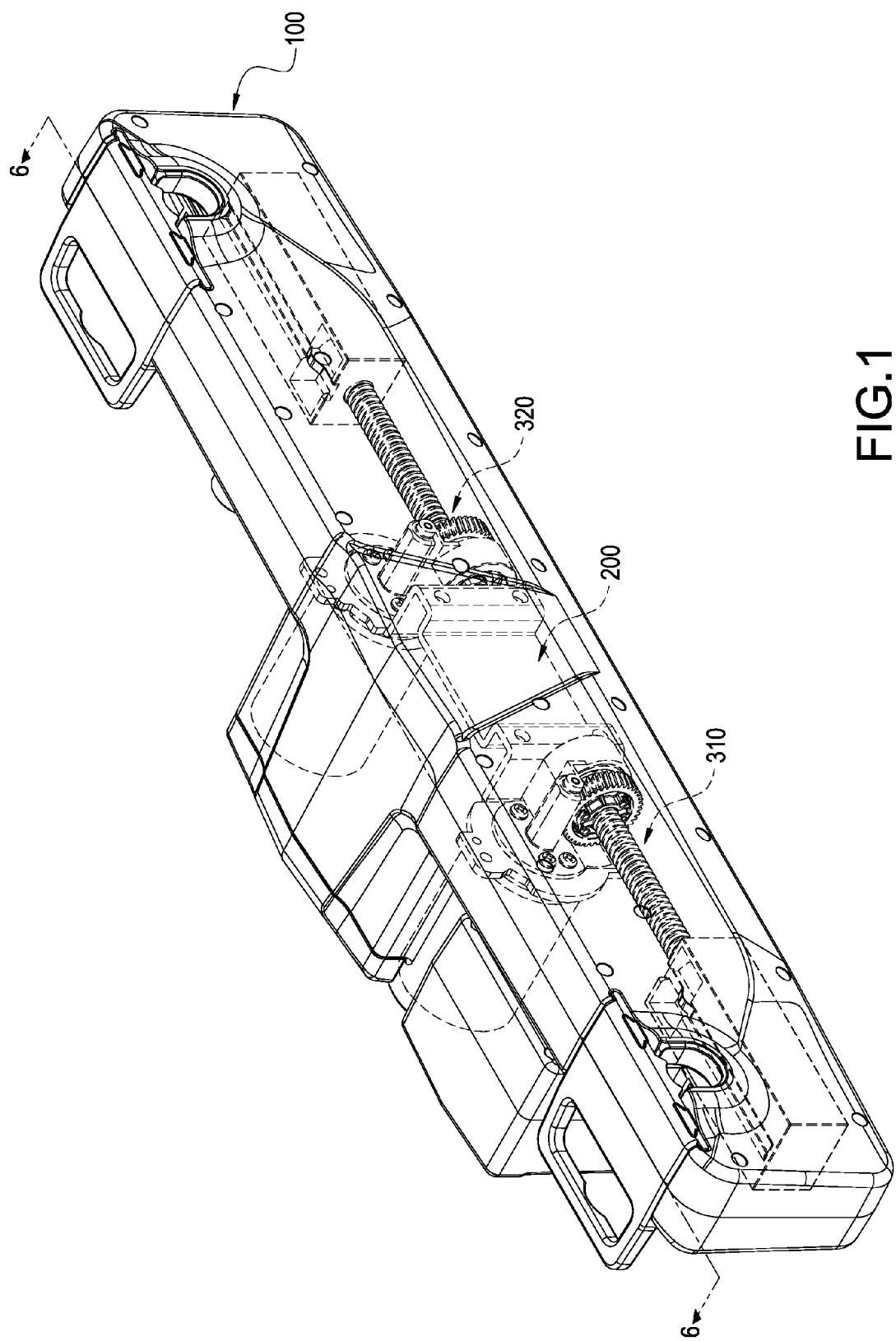
FIG. 1 is a perspective schematic view of a linear actuator according to the preferred embodiment of the present invention.
Figure 2:
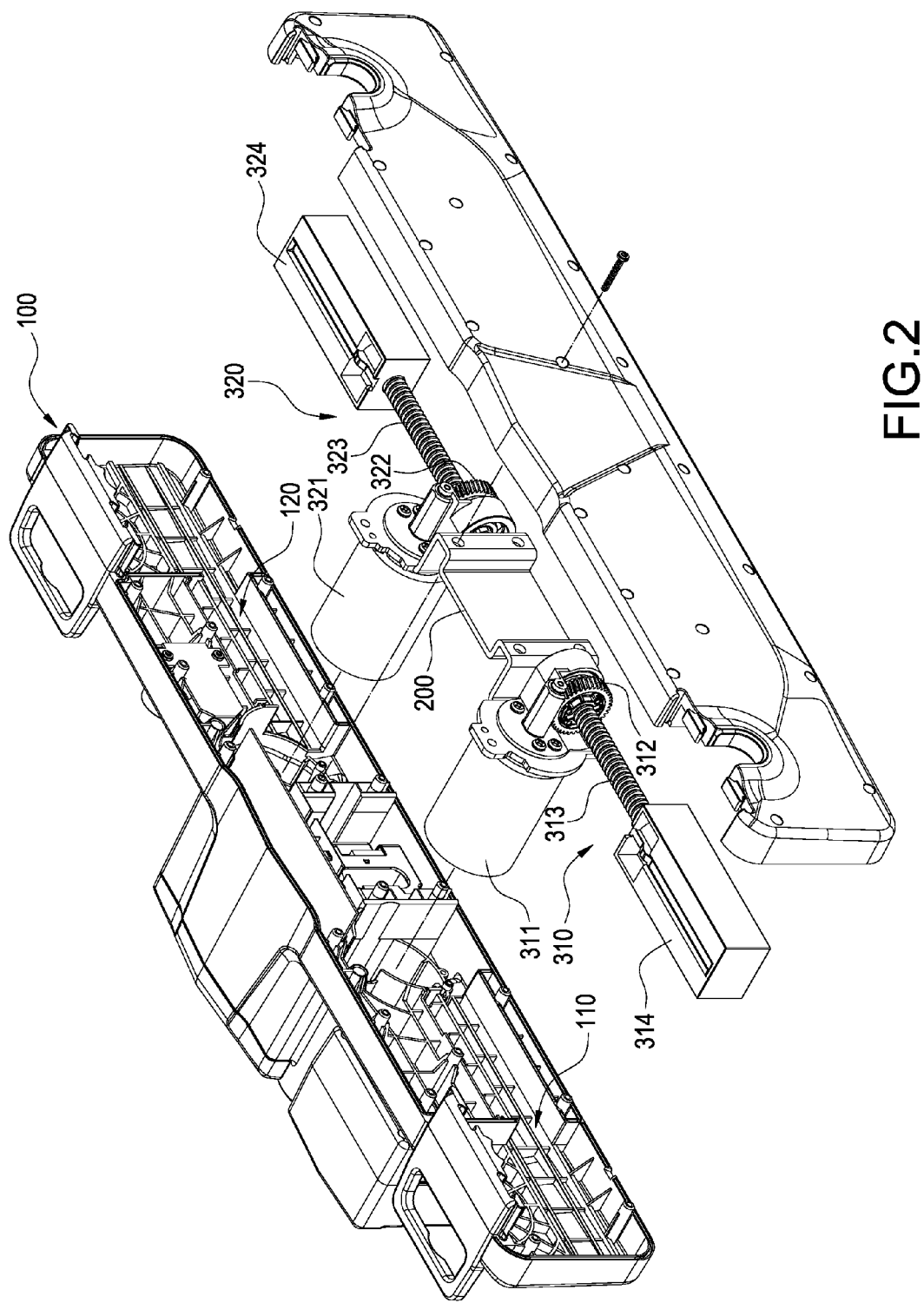
FIG. 2 is a perspective exploded view of a linear actuator according to the preferred embodiment of the present invention.

Please refer to FIGS. 1 and 2. The preferred embodiment of the present invention provides a linear actuator comprises a housing 100, a base plate 200, and two actuating mechanisms 310, 320.

In the current embodiment, the housing 100 is preferably a parallelepiped shell made of plastic, in which two tracks 110, 120 are disposed coaxially with each other. However, the present invention is not limited to this; for example, the housing may also be made of metal.

Figure 3:
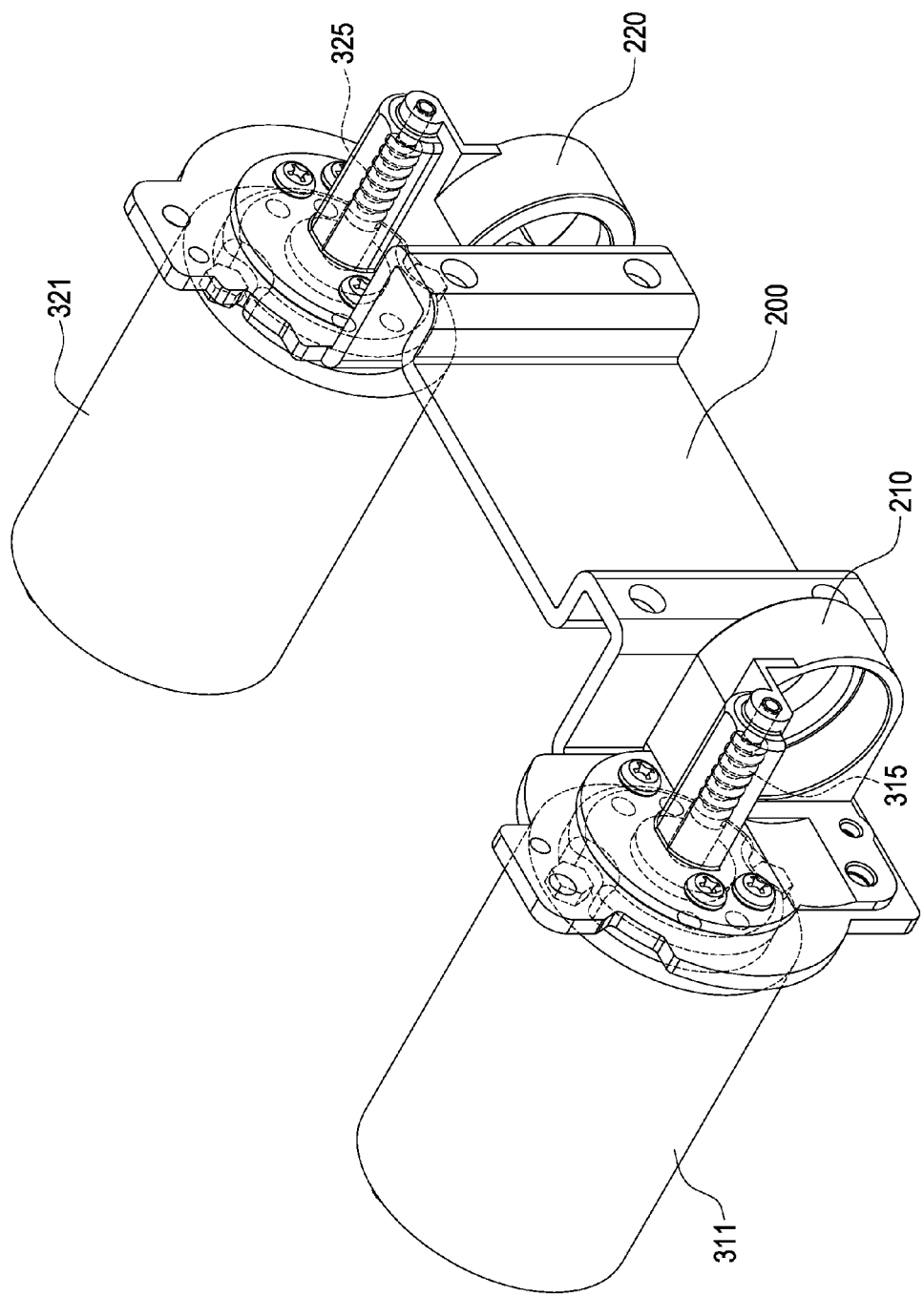
FIG. 3 is a schematic view of the configuration of the actuating mechanisms and the base plate according to the preferred embodiment of the present invention.
Figure 4:
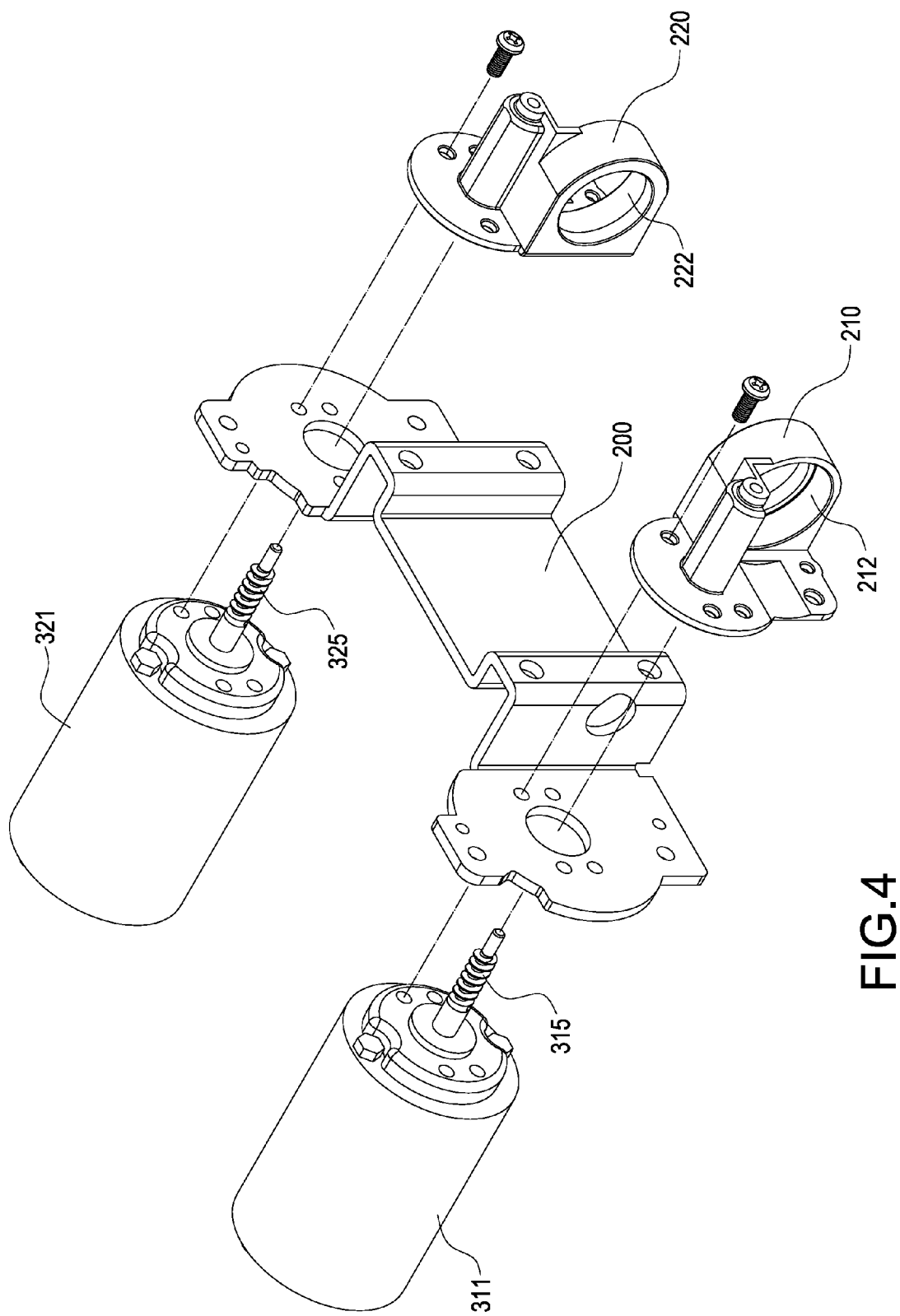
FIG. 4 is an exploded schematic view of the actuating mechanisms and the base plate according to the preferred embodiment of the present invention.
Figure 5:
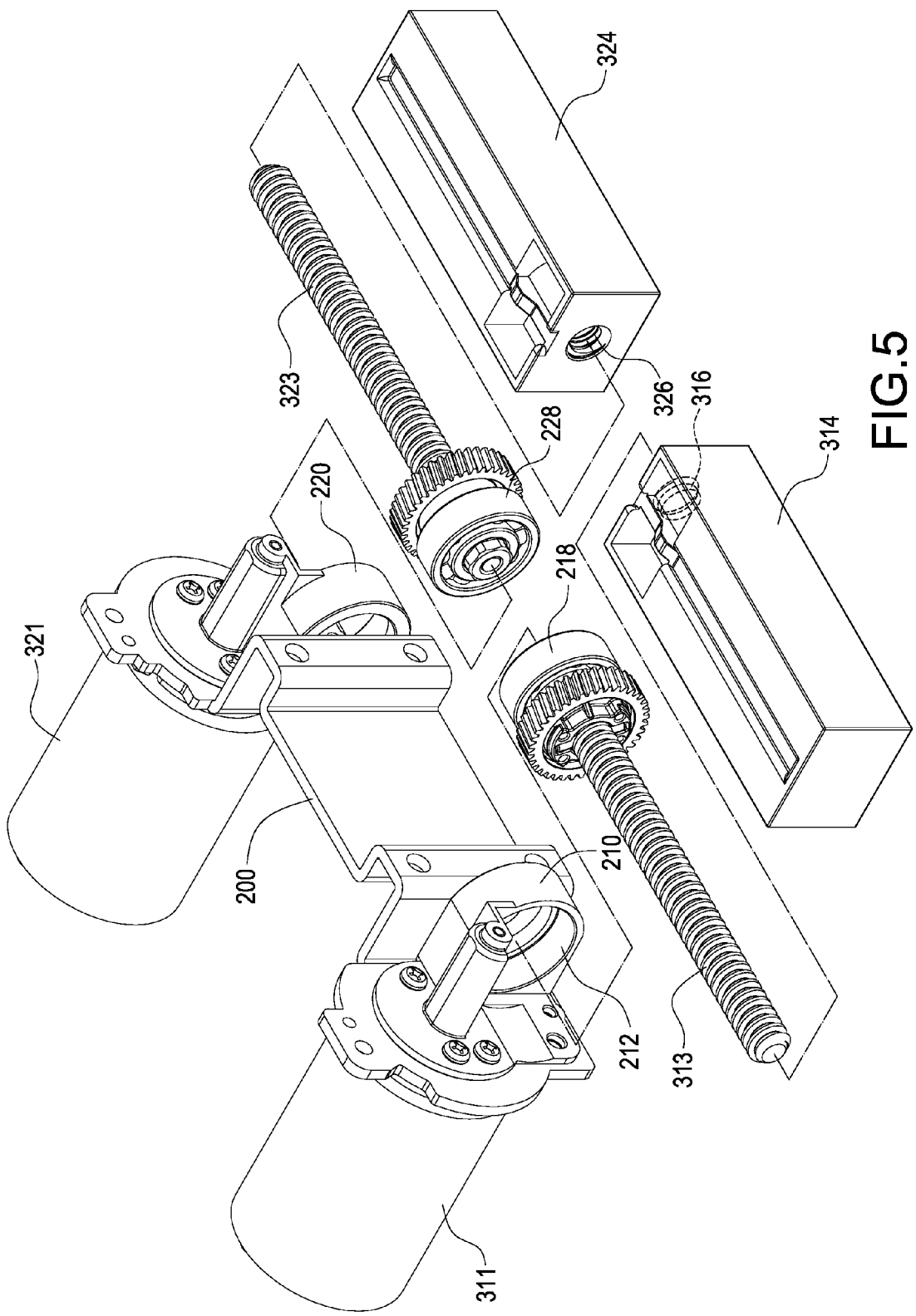
FIG. 5 is another exploded schematic view of the actuating mechanisms and the base plate according to the preferred embodiment of the present invention.
Figure 6:
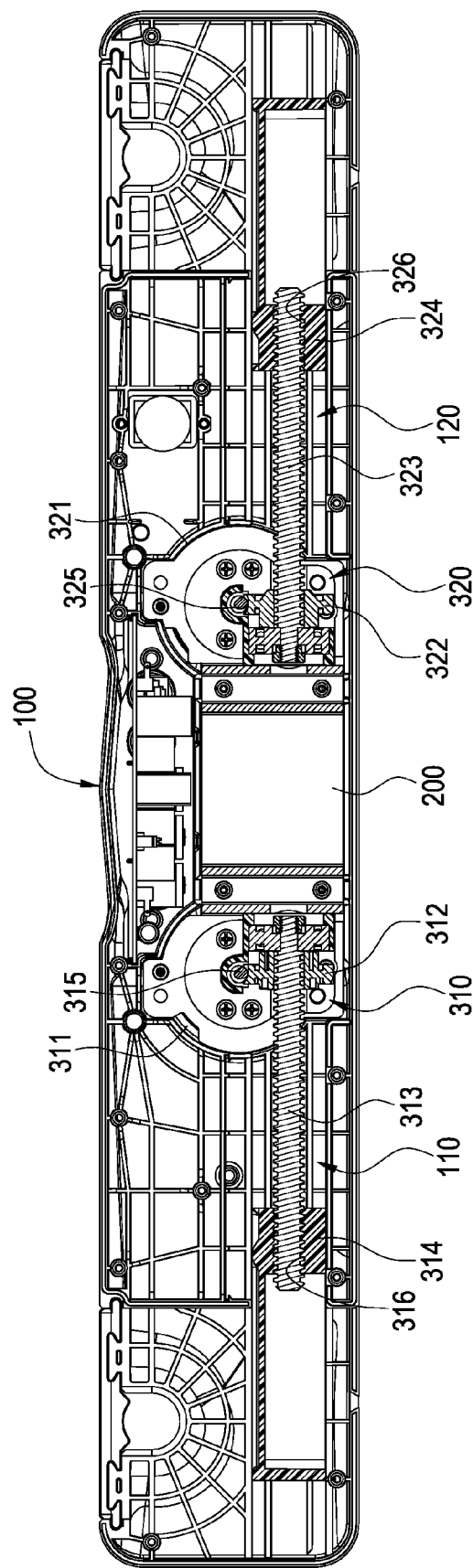
FIG. 6 is a cross-sectional view of a linear actuator according to the preferred embodiment of the present invention.

Referring to FIGS. 2-4, in the current embodiment, the base plate 200 is preferably a parallelepiped plate made of metal, which is disposed in the housing 100 and is preferably connected firmly to the housing 100 by screws.

Referring to FIGS. 3-6, two actuating mechanisms 310, 320 are disposed on two ends of the base plate 200, respectively, and are both received in the housing 100. The actuating mechanisms 310, 320 are configured to the two tracks 110, 120, respectively. Each actuating mechanism 310 or 320 comprises a motor 311 or 321, a transmission assembly 312 or 322, a screw rod 313 or 323, and a supporting block 314 or 324. The motor 311 or 321 comprises a driving shaft 315 or 325. The motors 311, 321 and the transmission assemblies 312, 322 are disposed on the base plate 200. In the current embodiment, the motor 311 or 321 and the corresponding transmission assembly 312 or 322 are screwed to opposite sides of the base plate 200, respectively. The driving shaft 315 or 325 of the motor 311 or 321 penetrates the base plate 200 to be kinetically connected the corresponding transmission assembly 312 or 322. Each screw rod 313 or 323 is disposed coaxially with the corresponding track 110 or 120. One end of each screw rod 313 or 323 is connected to and rotated by the corresponding transmission assembly 312 or 322. The supporting blocks 314, 324 are received and confined in the two tracks 110, 120 and thus only move along the two tracks 110, 120, respectively. The supporting block 314 or 324 is provided with an internal thread 316 or 326 for engaging with the other end of the each screw rod 313 or 323. When the screw rod 313 or 323 rotates, the supporting block 314 or 324 is driven by the screw rod 313 or 323 in conjunction with the internal thread 316 or 326 to move along the track 110 or 120 in the housing 100.

Figure 7:
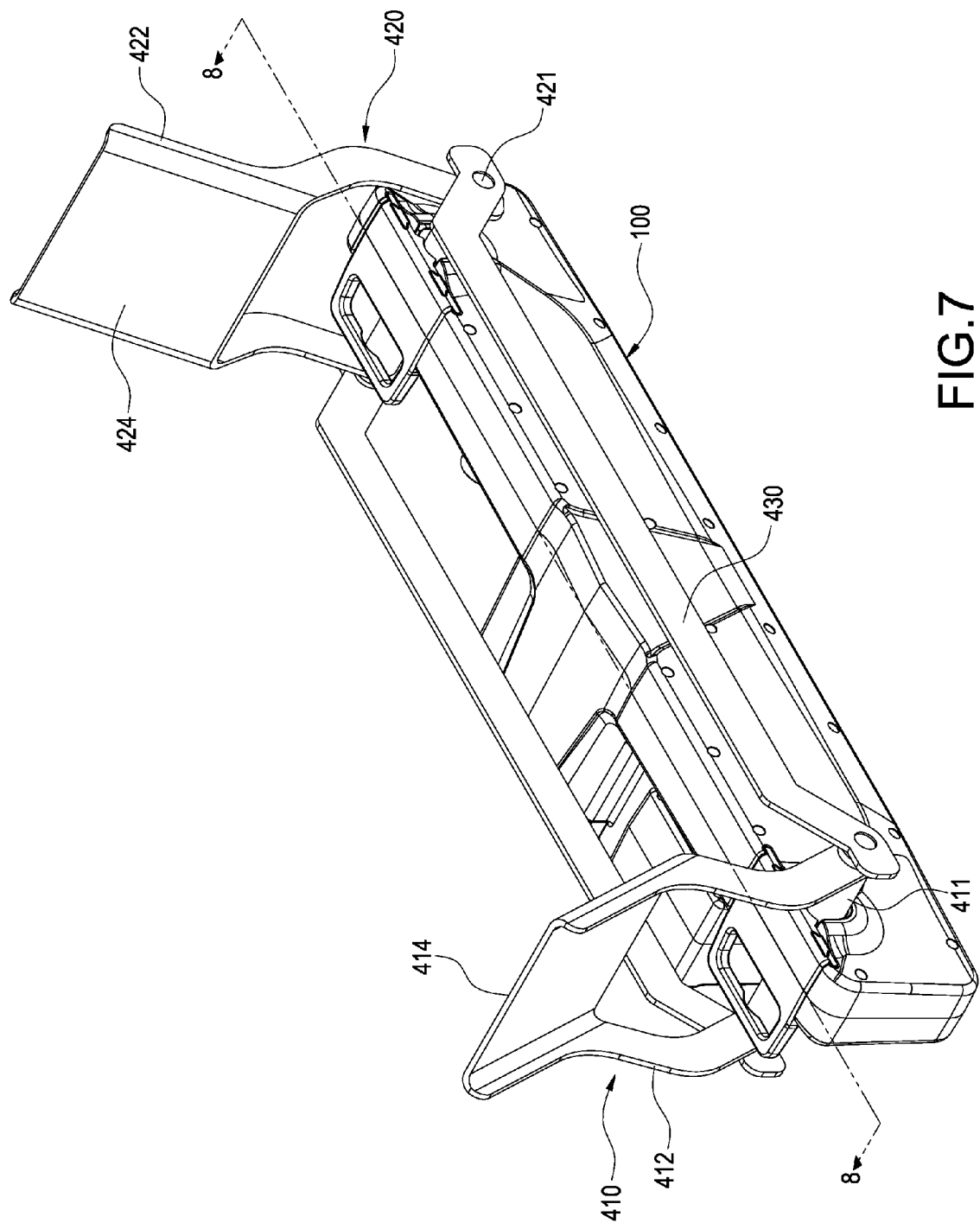
FIG. 7 is an operational schematic view of a linear actuator according to the preferred embodiment of the present invention.
Figure 8:
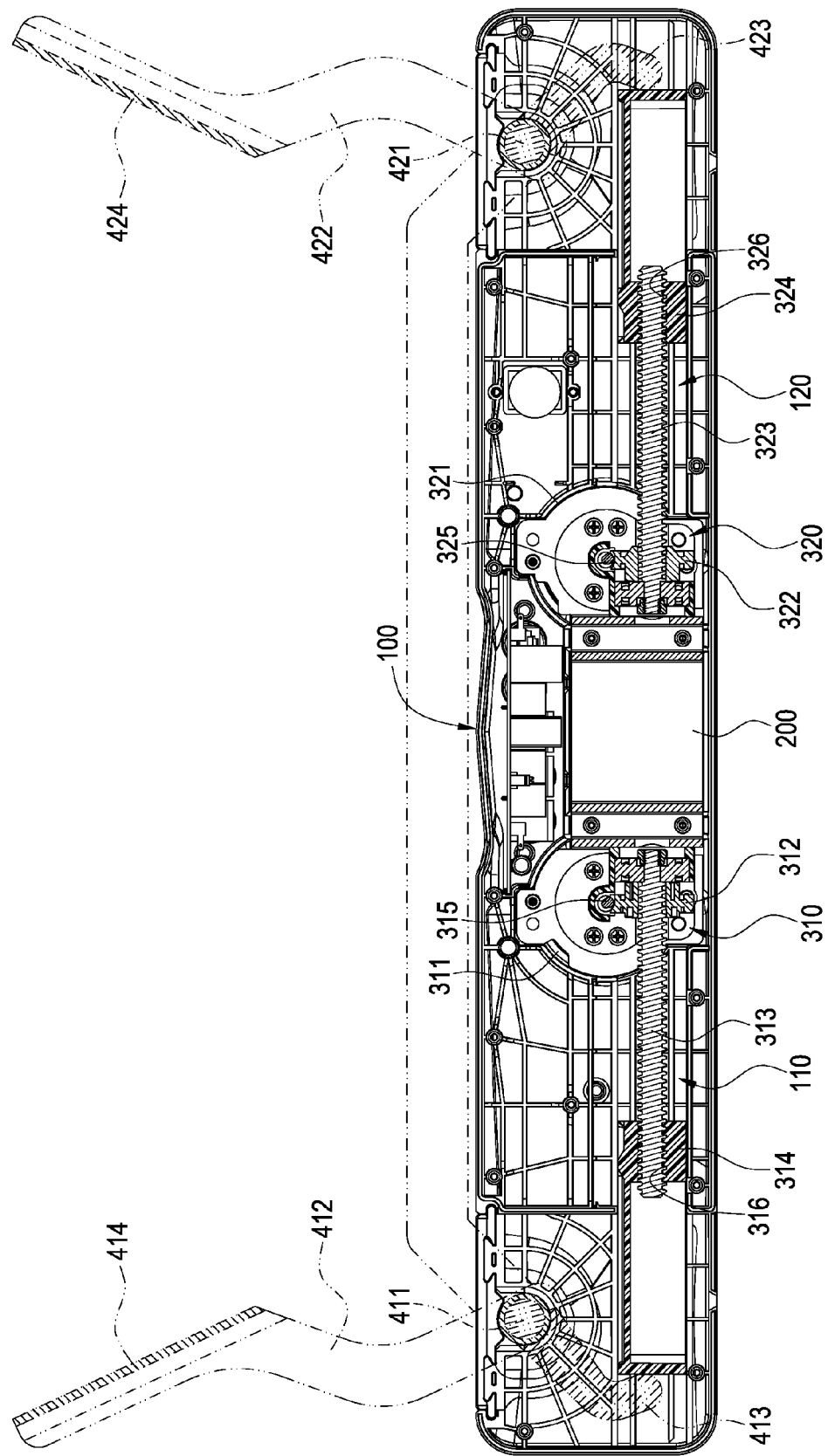
FIG. 8 is a schematic view of a linear actuator according to the preferred embodiment of the present invention during actuation.

Referring to FIGS. 7-8, the linear actuator of the present invention further comprises two linkage assemblies 410, 420 disposed at two sides of the housing 100. The linkage assemblies 410, 420 are used to actuate a mechanical structure (for example, the front end and rear end of a hospital bed). Each linkage assembly 410 or 420 is corresponding to the corresponding track 110 or 120 and pivoted to the housing 100. Each linkage assembly 410 or 420 comprises a pivot 411 or 421 extending radially to form at least one outer linage 412 or 422 and an inner linkage 413 or 423. In the current embodiment, two ends of each pivot 411 or 421 extend radially to form the respective outer linkages 412 or 422; two ends of the two outer linkages 412 or 422 are preferably connected to each other using a supporting plate 414 or 424 disposed in between. The support plate 412 or 422 is used to support against the mechanical structure. The central segment of the pivot 411 or 421 extends to form the inner linkage 413 or 423. The pivot 411 or 421 penetrates through and is pivoted to the housing 100; two ends of the pivot 411 or 421 penetrate out of the housing 100; two outer linkages 412 or 422 are both located outside the housing 100. The inner linkage 413 or 423 is located inside the housing 100 and is configured at one end of the corresponding track 110 or 120 to be pressed against by the corresponding supporting block 314 or 324 in the corresponding track 110 or 120.

Please refer to FIG. 8. When two motors 311, 321 operate to drive the two supporting blocks 314 (and 324) to move along the corresponding tracks 110, 120 toward the corresponding ends of the housing 100, the supporting blocks 314 and 324 press against the inner linkages 413 and 423, respectively, such that the inner linkages 413 and 423 rotate pivotally with respect to the pivots 411 and 421, respectively, and thus the outer linkages 412 and 422 can be driven and rotated pivotally with respect to the pivots 411, 421, respectively. in this way, two supporting plates 414 and 424 can move toward each other and actuate the mechanical structure.

Figure 9:
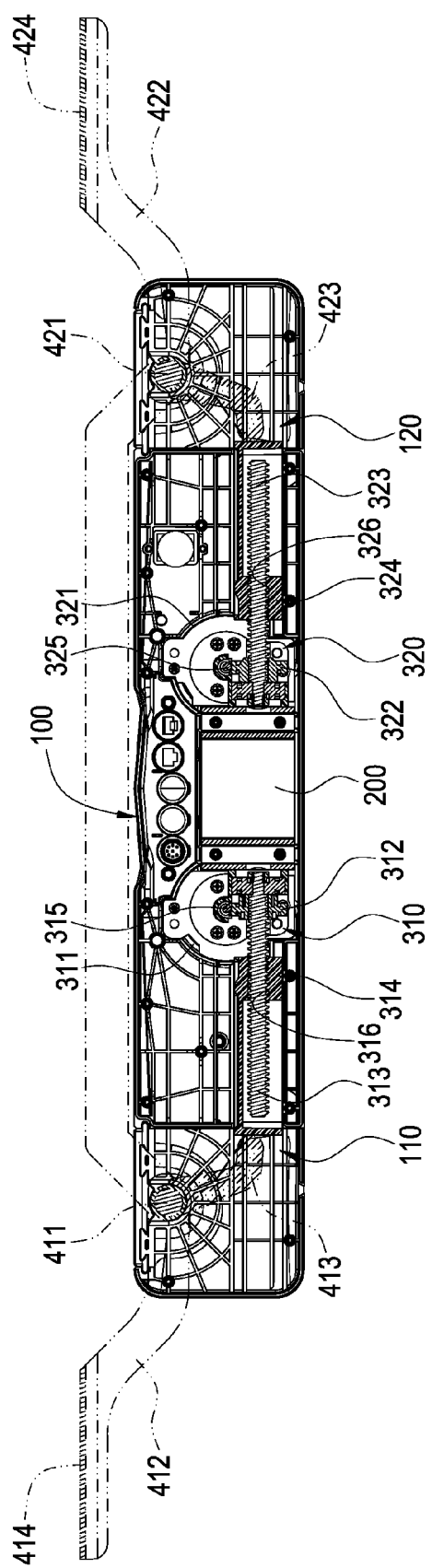
FIG. 9 is another schematic view of a linear actuator according to the preferred embodiment of the present invention during actuation.

Please refer to FIG. 9. When two motors 311, 321 operate to drive the two supporting blocks 314 (and 324) to move along the corresponding tracks 110, 120 toward the central segment of the housing 100, the supporting blocks 314 and 324 move and leave from the inner linkages 413 and 423, respectively. At this moment, the linkage assemblies 410 and 420 lose the supporting forces provided by the actuating mechanisms 310 and 320, respectively; therefore, the mechanical structure pushes the supporting plates 414 and 424 by gravity to move them away from each other.

The present invention uses the base plate 200 connected to the two actuating mechanisms 310 and 320 to withstand all the forces and torques generated during the operation of the two actuating mechanisms 310 and 320. Thus, the forces and torques exerted on the housing 100 can be decreased and further the structural strength requirement of the housing 100 can be reduced, thereby extending the lifetime of the actuator and lowering the manufacturing cost The above description is only for the preferred embodiments of the present invention, but not to limit the scope of claims of the present invention. Other equivalent variations according to the claimed spirit of the present invention should be embraced within the claimed scope of the present invention.

What is claimed is:

1. A linear actuator, comprising:
   a housing (100);
   a base plate (200) disposed within and completely surrounding the housing (100);
   two hub elements (210/220) disposed on two ends of the base plate (200), respectively; and
   two actuating mechanisms (310, 320) disposed on the base plate (200) and completely received in the housing (100), each of the two actuating mechanisms (310, 320) comprising a motor (311/321), a transmission assembly (312/322), a screw rod (313/323), and a supporting block (314/324), wherein the two motors (311/321) and the two transmission assemblies (312, 322) are disposed on the base plate (200), the two motors (311, 321) are kinetically connected to the two transmission assemblies (312, 322), respectively, one end of the screw rod (313/323) is connected to and rotated by the transmission assembly (312/322), the other end of the screw rod (313/323) is screwed to the supporting block (314/324), and two supporting blocks (314, 324) are driven to move in the housing (100), wherein each hub element has a receiving portion (212/222), and each transmission assembly (312/322) has a bearing (218/228) nested in the receiving portion (212/222).

2. The linear actuator according to claim 1, wherein two tracks (110, 120) are formed in the housing (100), the two actuating mechanisms (310, 320) are configured to correspond to the two tracks (110, 120), respectively, and the two supporting blocks (314, 324) are received in the two tracks (110, 120), respectively.

3. The linear actuator according to claim 2, further comprising two linkage assemblies (410, 420), each of which corresponding to a corresponding track (110/120) and pivoting with respect to the housing (100), wherein one end of each linkage assembly (410/420) is located outside the housing (100), and the other end of the each linkage assembly (410/420) is located inside the housing (100) and configured at one end of the corresponding track (110/120).

4. The linear actuator according to claim 3, wherein each linkage assembly (410/420) comprises a pivot (411/421) penetrating through and pivoting with respect to the housing (100), wherein two outer linkages (412/422) located outside the housing (100) each connect at two ends of a respective pivot (411/421) and an inner linkage (413/423) located inside the housing (100) and configured at one end of the corresponding track (110/120) to be pressed against by a corresponding supporting block (314/324) in the corresponding track (110, 120).

5. The linear actuator according to claim 4, wherein a supporting plate (414/424) is connected between the two outer linkages (412/422).

6. The linear actuator according to claim 4, wherein a supporting linkage (430) is connected between the two pivots (411/421).

7. The linear actuator according to claim 1, wherein the motor (311/321) of the actuating mechanism (310, 320) and the transmission assembly (312/322) are disposed on opposite sides of the base plate (200).

8. The linear actuator according to claim 7, wherein the motor (311/321) comprises a driving shaft (315/325) penetrating the base plate (200) to be connected to the transmission assembly (312/322).

9. The linear actuator according to claim 1, further comprising two linkage assemblies (410, 420), each of which pivoting to the housing (100), wherein one end of each linkage assembly (410/420) is located outside the housing (100), and the other end of the each linkage assembly (410/420) is located inside the housing (100) and pressed against one of the two supporting blocks (314, 324).

10. The linear actuator according to claim 1, wherein the base plate (200) is connected to the housing (100) by screws.

* * * * *